United States Patent
Carru et al.

(10) Patent No.: US 11,507,685 B1
(45) Date of Patent: *Nov. 22, 2022

(54) PRIVILEGE BASED ACCESS CHECKS FOR QUERY RESULTS

(71) Applicant: Snowflake Inc., Bozeman, MT (US)

(72) Inventors: Damien Carru, New York, NY (US); Thierry Cruanes, San Mateo, CA (US); Subramanian Muralidhar, Mercer Island, WA (US); Nicola Dan Onose, San Jose, CA (US); Ryan Michael Thomas Shelly, San Francisco, CA (US); Brian Smith, Hillsborough, CA (US); Jaeyun Noh, Sunnyvale, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/586,646

(22) Filed: Jan. 27, 2022

Related U.S. Application Data

(63) Continuation of application No. 17/487,716, filed on Sep. 28, 2021, now Pat. No. 11,270,020.

(51) Int. Cl.
| | |
|---|---|
| *H04L 29/06* | (2006.01) |
| *G06F 21/62* | (2013.01) |
| *H04L 9/40* | (2022.01) |
| *G06F 16/245* | (2019.01) |
| *H04L 9/32* | (2006.01) |
| *G06F 16/248* | (2019.01) |

(52) U.S. Cl.
CPC ........ *G06F 21/6227* (2013.01); *G06F 16/245* (2019.01); *G06F 16/248* (2019.01); *H04L 9/3213* (2013.01); *H04L 63/102* (2013.01); *H04L 63/105* (2013.01)

(58) Field of Classification Search
CPC .. G06F 21/6227; G06F 16/245; G06F 16/248; H04L 9/3213; H04L 63/102; H04L 63/105

See application file for complete search history.

(56) References Cited

U.S. PATENT DOCUMENTS

| | | | |
|---|---|---|---|
| 8,321,460 | B2 | 11/2012 | Munday |
| 11,263,268 | B1* | 3/2022 | Bourbie .................. G06F 9/451 |
| 11,270,020 | B1 | 3/2022 | Carru et al. |
| 2016/0335323 | A1 | 11/2016 | Teodorescu et al. |
| 2020/0327252 | A1* | 10/2020 | McFall ................... G06F 21/78 |

OTHER PUBLICATIONS

"U.S. Appl. No. 17/487,716, Notice of Allowance dated Dec. 21, 2021", 17 pgs.
U.S. Appl. No. 17/487,716 U.S. Pat. No. 11,270,020, filed Sep. 28, 2021, Privilege Based Access Checks for Query Results.

* cited by examiner

*Primary Examiner* — Tri M Tran
(74) *Attorney, Agent, or Firm* — Schwegman Lundberg & Woessner, P.A.

(57) ABSTRACT

Techniques described herein can allow users to share cached results of an original query with other users while protecting sensitive information. The techniques described herein can check whether the other users have access to the underlying data queried before allowing those users to see the stored query results. That is, the system may perform privilege checks on the shared users before giving them access to the stored query results but without having to re-run the original query.

21 Claims, 9 Drawing Sheets

US 11,507,685 B1

PRIVILEGE BASED ACCESS CHECKS FOR QUERY RESULTS

CROSS-REFERENCE TO RELATED APPLICATION

This application is a continuation of U.S. patent application Ser. No. 17/487,716, filed Sep. 28, 2021, which is incorporated by reference herein in its entirety.

TECHNICAL FIELD

The present disclosure generally relates databases and more particularly to sharing query results in database systems while maintaining privilege-based access and security.

BACKGROUND

As the world becomes more data driven, database systems and other data systems are storing more and more data. Databases are widely used for data storage and access in computing applications. Using queries is one technique for analyzing data stored in a database system. Users oftentimes will want to share data from query results with other users.

One approach to sharing data is requiring users to re-run queries. Thus, a user can share the query syntax, but the query is re-run for each shared user. However, executing queries can be expensive and time consuming, so this approach involving re-running queries is not efficient.

Another approach is to share the data from the query results with other users with no protection. Hence, after executing a query, a user can share the results with other users by simply sending them the results. This approach suffers from significant drawbacks because it typically cannot sufficiently protect sensitive data. Thus, a user who would not have had sufficient access to execute a query may gain access to sensitive data.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Techniques described herein can allow users to share cached results of an original query with other users while protecting sensitive information. The techniques described herein can check whether the other users have access to the underlying data queried before allowing those users to see the stored query results. That is, the system may perform privilege checks on the shared users before giving them access to the stored query results but without having to re-run the original query. In some embodiments, the sharing techniques can be implemented by using a security token that is encrypted when the original query is executed. The security token can include top-level information of the tables accessed as part of the query. When another user attempts to access the query results, the security token can be passed to a permission engine, which checks that the user who is trying the read query results has access to the underlying tables referenced in the query results based on the information stored in the token. If the user has privileges to view the underlying tables referenced in the query, access can be granted to viewing the query results. However, if the user does not have the appropriate privileges, access can be denied.

Figure 1:
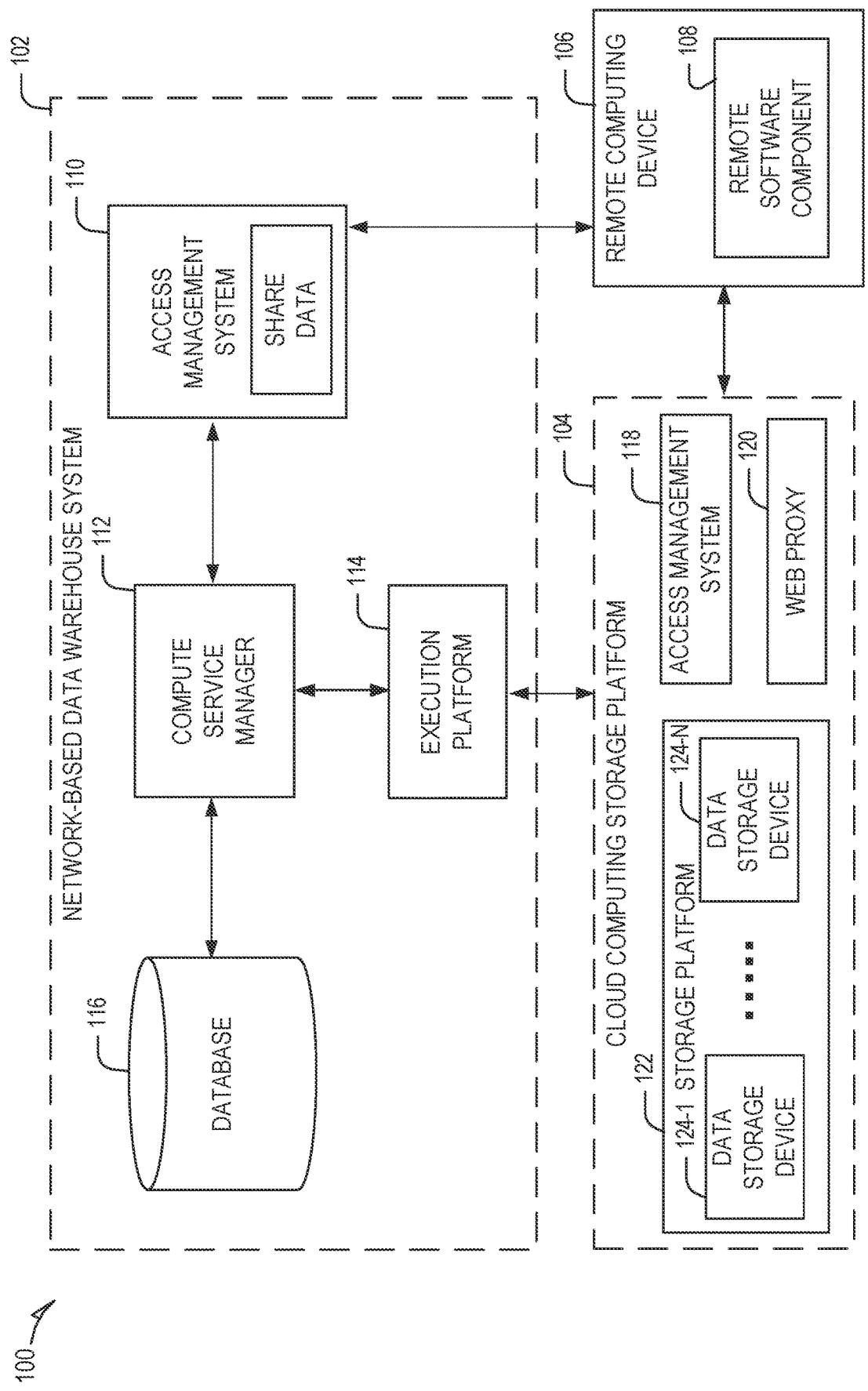
FIG. 1 illustrates an example computing environment in which a cloud database system can implement streams on shared database objects, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based database system 102 comprises an access management system 110, a compute service manager 112, an execution platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data warehouse system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
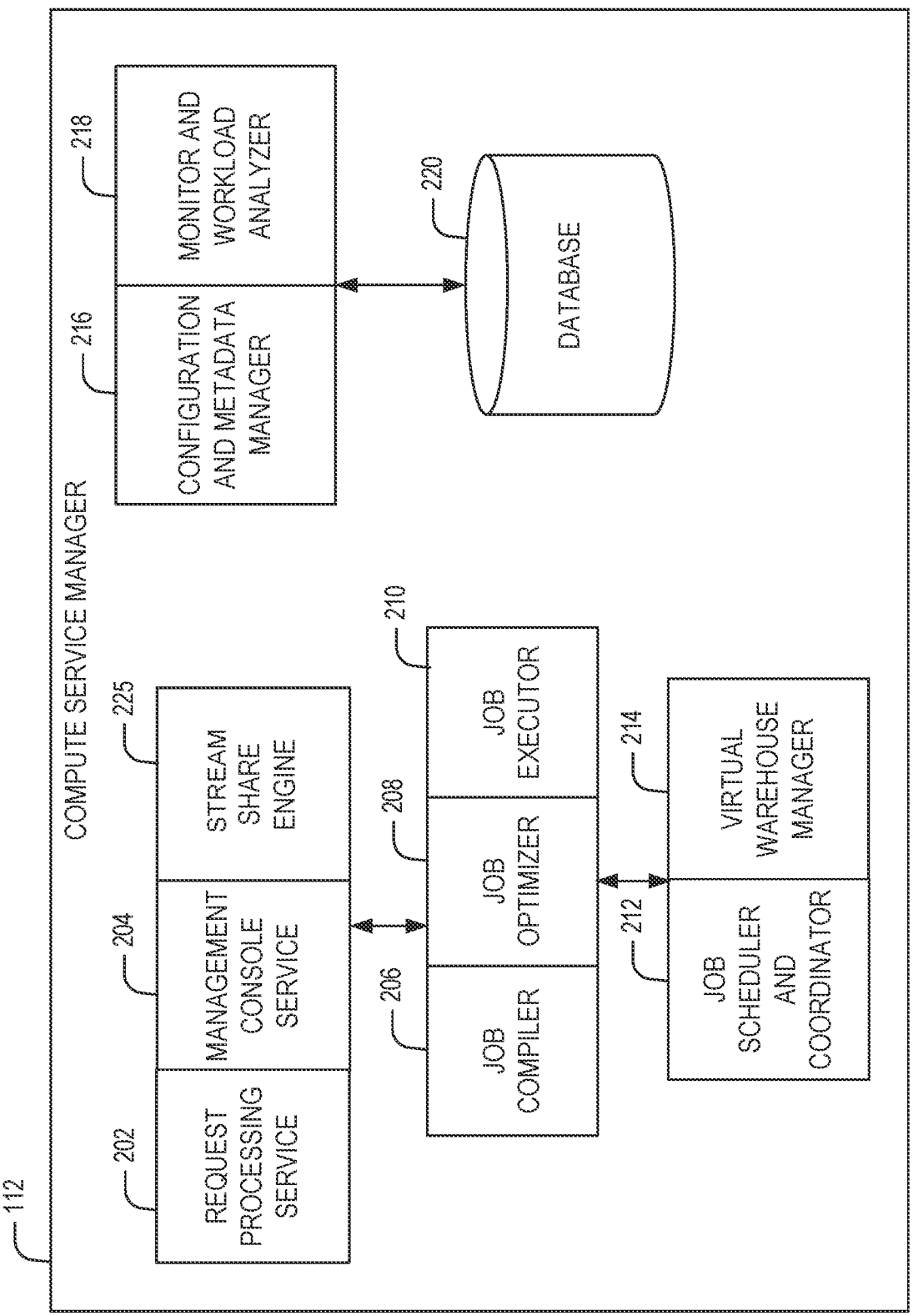
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based database system 102. For example, data storage device 220 may represent caches in execution platform 114, storage devices in cloud computing storage platform 104, or any other storage device.

Figure 3:
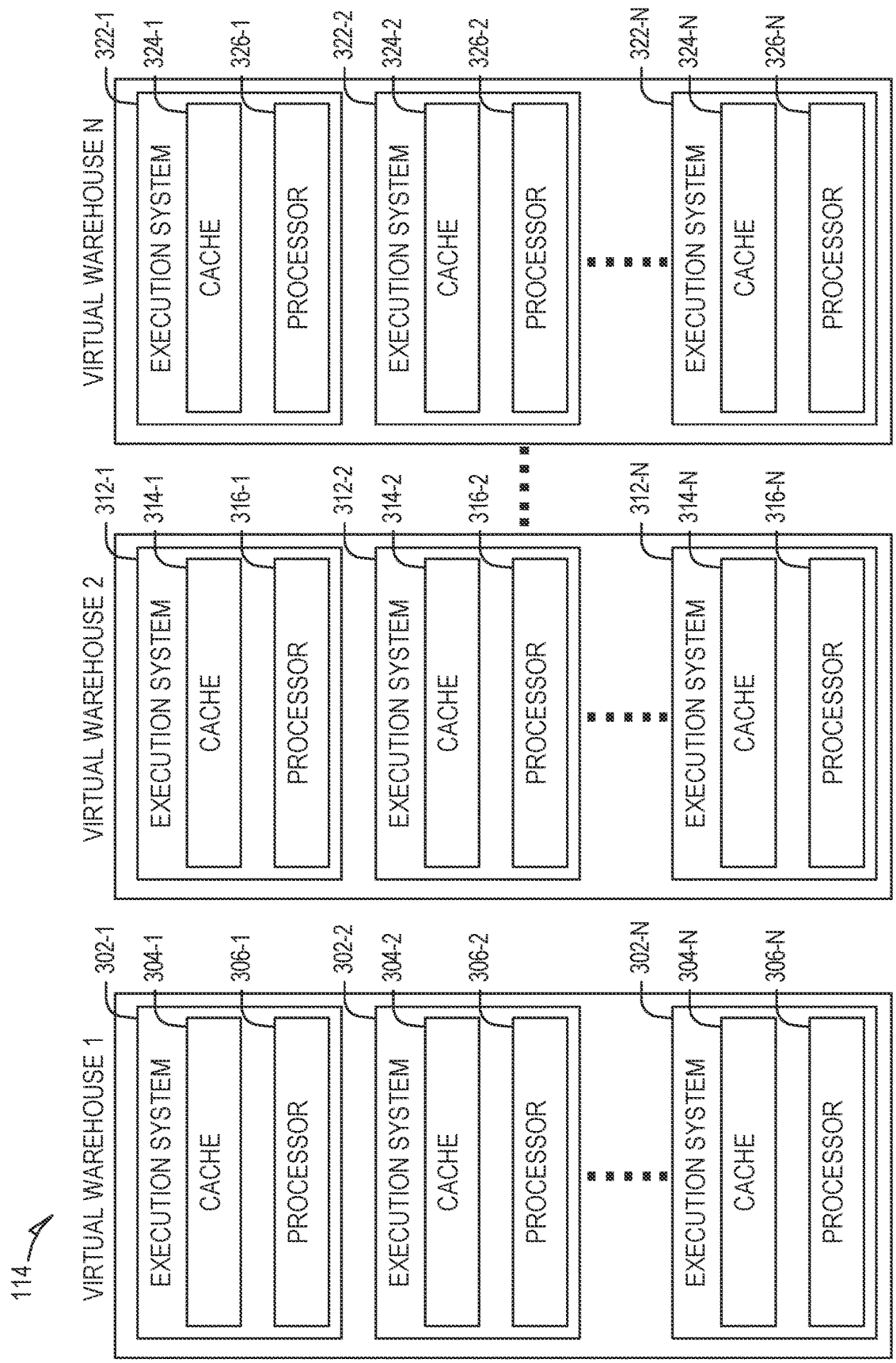
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
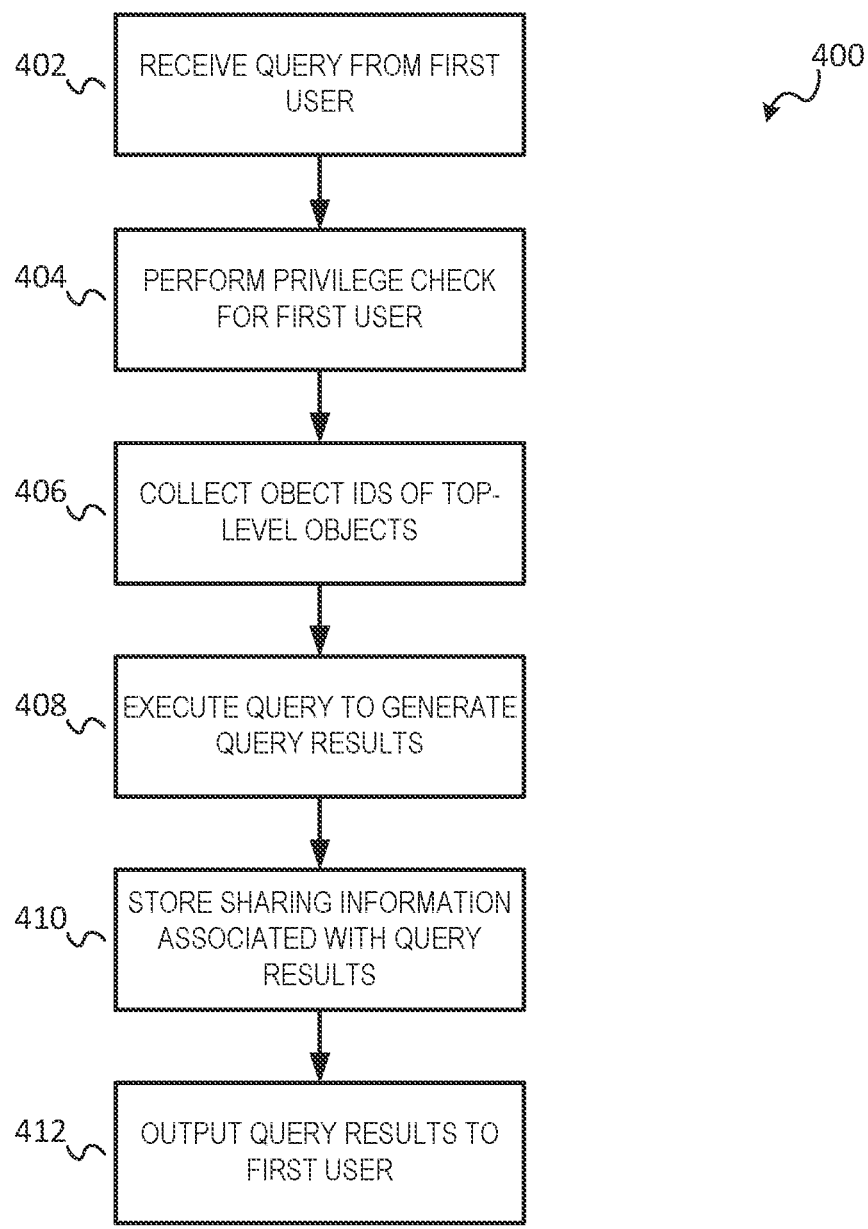
FIG. 4 illustrates a flow diagram for a method for generating query results for sharing, according to some example embodiments.

Next, techniques for sharing query results while maintaining privilege checks will be described. Privilege checks may be performed by a permission engine. FIG. 4 illustrates a flow diagram for a method 400 for generating query results for sharing, according to some example embodiments. At operation 402, a query may be received from a first user. The query may be processed by a Global Service (GS) where it is compiled. A parse tree for the query may be generated. The query may be converted from SQL text to abstract syntax tree.

At operation 404, the system may perform a privilege check for the first user to run the query. The privilege check may be performed based on directly referenced objects or top-level objects referenced in the query (e.g., objects in the parse tree). Top-level objects may include tables or sections of tables, for example. The privilege check may include comparing the role of the first user with the access privileges of the top-level objects referenced in the query.

At operation 406, the system may collect object IDs of the top-level objects referenced in the query (e.g., objects in the parse tree). The object IDs may include domain and entity IDs of the top-level objects referenced in the query, including container objects. At operation 408, the query may be executed generating query results. At operation 410, sharing information regarding the collected object IDs may be stored, for example in a metadata database. The sharing information regarding the collected object IDs may be associated or linked to the query results, which may also be stored. For example, the query results may be cached. At 412, the query results may be outputted to the first user. In an embodiment, the first user may also be notified that the query results are sharable.

Figure 5:
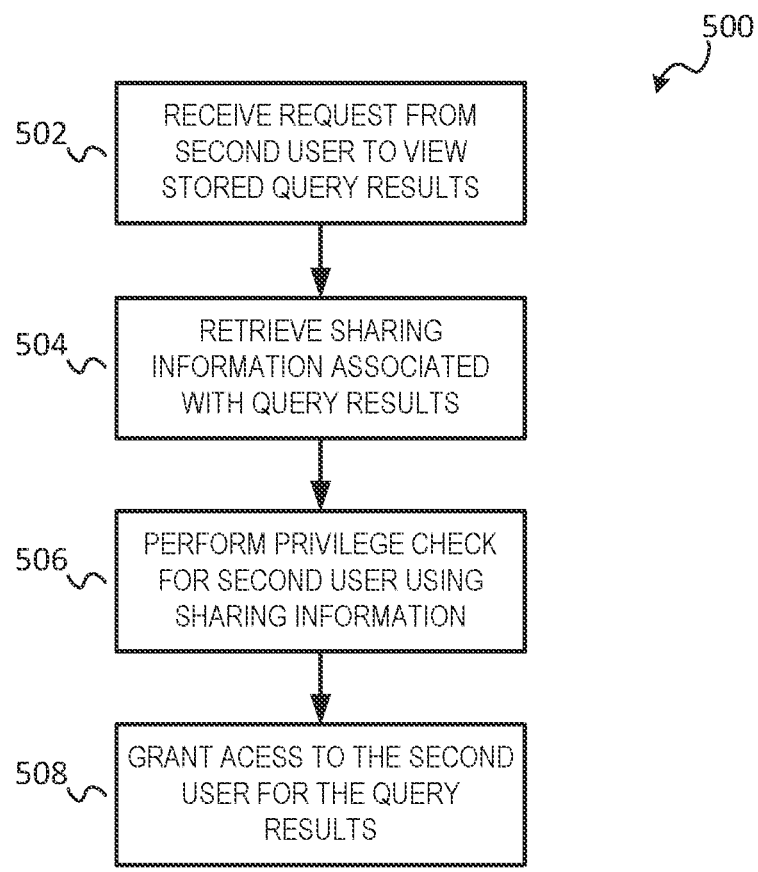
FIG. 5 illustrates a flow diagram for a method for receiving access to shared query results, according to some example embodiments.

FIG. 5 illustrates a flow diagram for a method 500 for receiving access to shared query results, according to some example embodiments. At operation 502, the system may receive a request from a second user to view stored query results, for example of the query described above with referenced to FIG. 4. At operation 504, the system may retrieve the stored sharing information regarding the collected object IDs of the top-level objects referenced in the query.

At operation 506, the system may perform a privilege check for the second user to access the stored query results using the sharing information without re-running the query. The privilege check may be performed on the collected object IDs of the top-level objects referenced in the query (e.g., objects in the parse tree). The privilege check may include comparing the role of the second user with the access privileges of the top-level objects referenced in the query. For example, the system may check that the second user's role has access privileges to all of the top-level objects references in the query.

At operation 508, the system may grant access to the query results to the second user based on the privilege check. If the privilege check for the second user privilege check is successful, the system may output the query results to the second user. If, however, the privilege check for the second user fails, the system may deny access to the query results to the second user.

Tokens may be used to implement sharing of query results. Security tokens may be created at the time of executing a query with relevant information to perform future privilege checks for shared users. The security tokens can be encrypted. The security tokens can then be shared with other users wanting access to the stored query results. For each other user, the security token can be decrypted and a privilege check can be performed using the information stored in the token to provide access to the respective query result.

Figure 6:
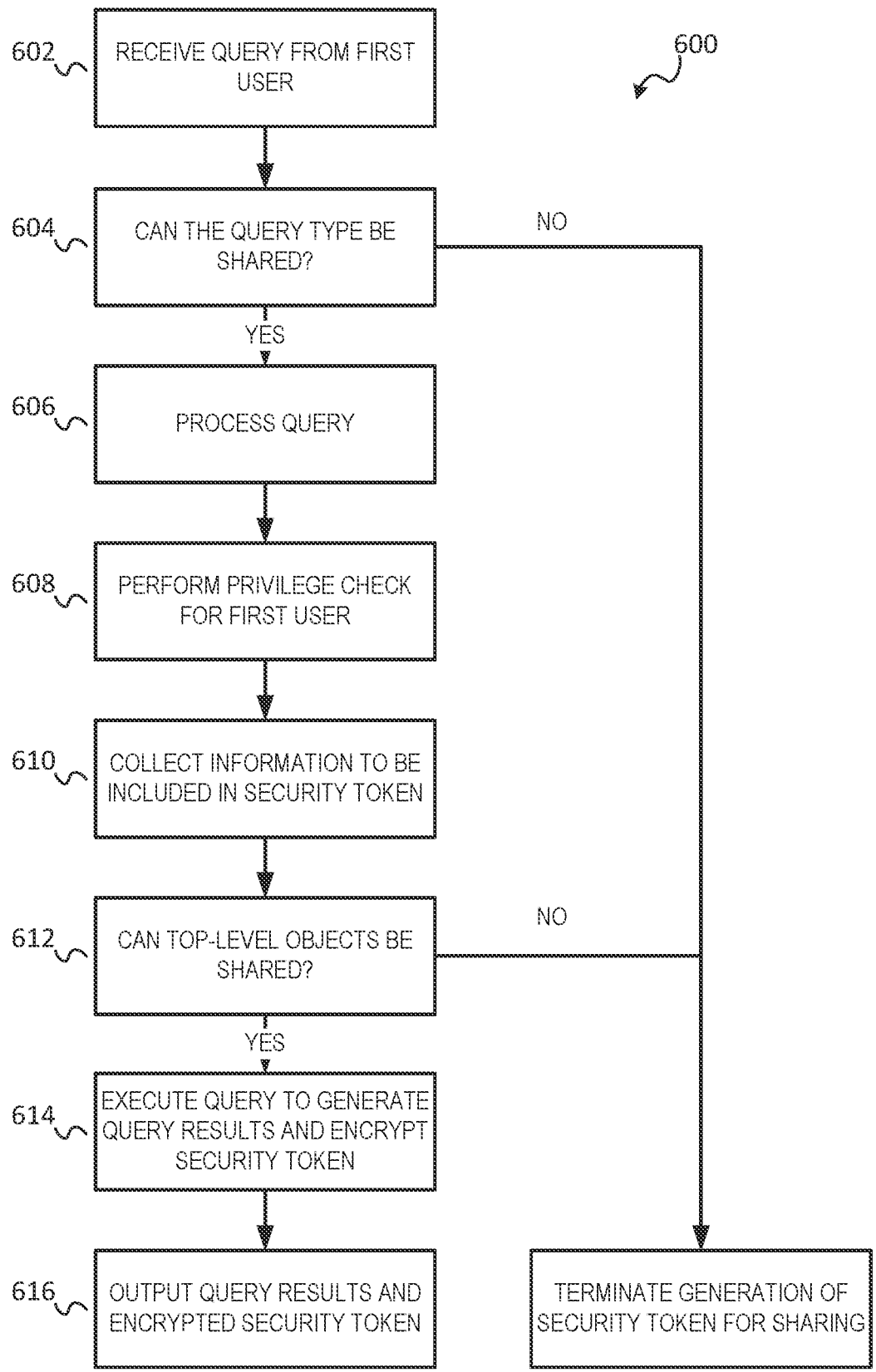
FIG. 6 illustrates a flow diagram for a method for generating a security token for sharing query results, according to some example embodiments.

FIG. 6 illustrates a flow diagram for a method 600 for generating a security token for sharing query results, according to some example embodiments. At operation 602, a query may be received from a first user. At 604, the system may detect whether this query is a type of query that can be shared. For example, this detection may be performed by a user interface (UI) of the system. In one embodiment, a sharable query may be a query that is run in the context of a worksheet or dashboard. For example, a query that is automatically run on behalf of users outside of a worksheet or dashboard may be designated as non-sharable. If the system detects that the instant query is non-sharable, the security token generation may be terminated and the query may be processed accordingly without the generation of a security token to share the query results.

At operation 606, if the query is detected to be a sharable type query, the query may be processed by a Global Service (GS) where it is compiled. A parse tree for the query may be generated. The query may be converted from SQL text to abstract syntax tree.

At operation 608, the system may perform a privilege check for the first user to run the query. The privilege check (i.e., privilege-based access check) may be performed based on the top-level objects referenced in the query (e.g., objects in the parse tree). The privilege check may include comparing the role of the first user with the access privileges of the top-level objects referenced in the query.

At operation 610, the system may collect information to be included in the security token such as object IDs of the top-level objects referenced in the query. The object IDs may include domain and entity IDs of the top-level objects referenced in the query, including container objects. The system may also collect other relevant information such as the user ID of the user running the query and the job ID. The collected information may be stored in a JSON object.

At operation 612, the system may check if all top-level objects referenced in the query can be shared. If any of the referenced objects are determined as non-sharable, then the security token generation may be terminated, and the query may be processed accordingly without the generation of a security token to share the query results.

For example, the system may check if any of the referenced objects are subject to column-level masking, row-level security, and/or a current environment function (e.g., a CURRENT_USER in a view definition). To ensure this sharing feature is not used to circumvent access checks in a view definition, sharing may be disabled if the query references certain current environment functions. For example, the following "current environment" functions may trigger disabling of the sharing of the query results:

CURRENT_CLIENT
INOVKER_ROLE
INVOKER_SHARE
IS_GRANTED_TO_INVOKER_ROLE
INVOKER_SHARE
CURRENT_ROLE
CURRENT_USER
CURRENT_ACCOUNT
CURRENT_ACCOUNT_LOCATOR
CURRENT_ACCOUNT_ALIAS
CURRENT_REGION
CURRENT_IP_ADDRESS
IS_ROLE_IN_SESSION
CURRENT_SECONDARY_ROLES.

However, there may be other current environment functions that are not used for access checks, such as CURRENT_TIMESTAMP and CURRENT_DATABASE. Thus, these type of function when used in a query may still allow the query results to be shared. For example, "the following "current environment" functions may not trigger disabling sharing of the query results:

CURRENT_DATABASE
CURRENT_DATE
CURRENT_STATEMENT
CURRENT_SCHEMA
CURRENT_TIMESTAMP
CURRENT_TIME
CURRENT_WAREHOUSE

At operation 614, if all objects are determined to be shareable, the query may be executed generating query results and the security token may be encrypted. For example, the security token may include the object IDs of the top-level objects referenced in the query, the user ID, and the job ID. The security token may be encrypted with a token encryption key. The security token may be encrypted using account level information associated with the current user. In this example, the query results are only sharable within an account because account level information is needed to decrypt the security token, as described in further detail below. The token may be encrypted using the same or similar secret key used for the session. In an example, an expiration time for the token may also be generated and encrypted (e.g., 365 days).

At 616, the query results may be outputted to the first user along with the encrypted security token. In an embodiment, the first user may also be notified that the query results are sharable. In an example, the sharing token may be displayed in a dashboard or worksheet (e.g., via a link), indicating that the stored query result is sharable.

Figure 7:
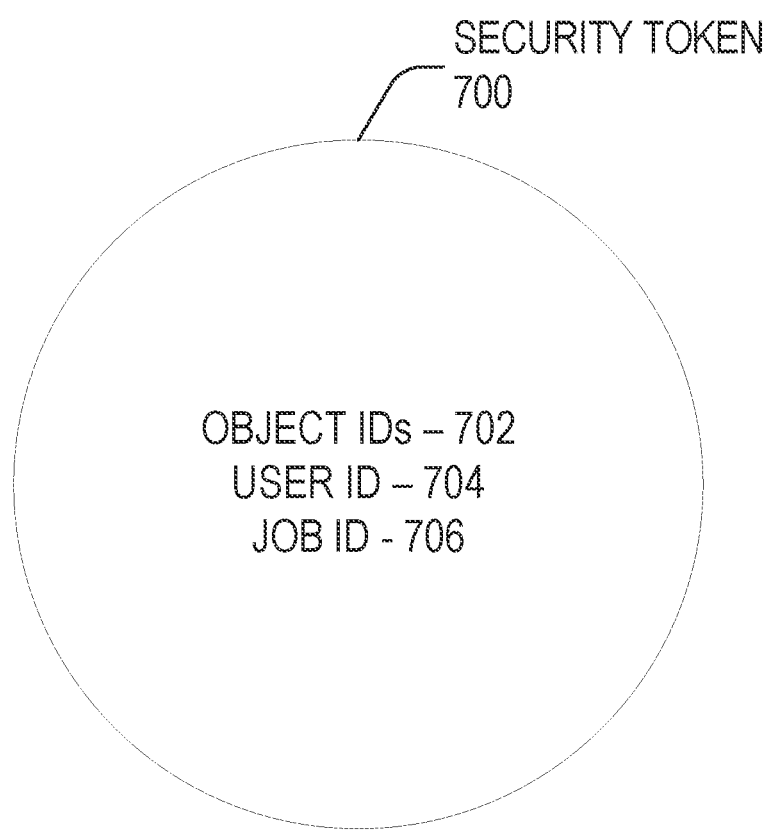
FIG. 7 illustrates an example of a security token, according to some example embodiments.

FIG. 7 illustrates an example of a security token 700, according to some example embodiments. The security token may include the object IDs 702 of the top-level objects referenced in the respective query, the user ID 704 of the user who ran the original query, and the job ID 706 where the original query was run.

Figure 8:
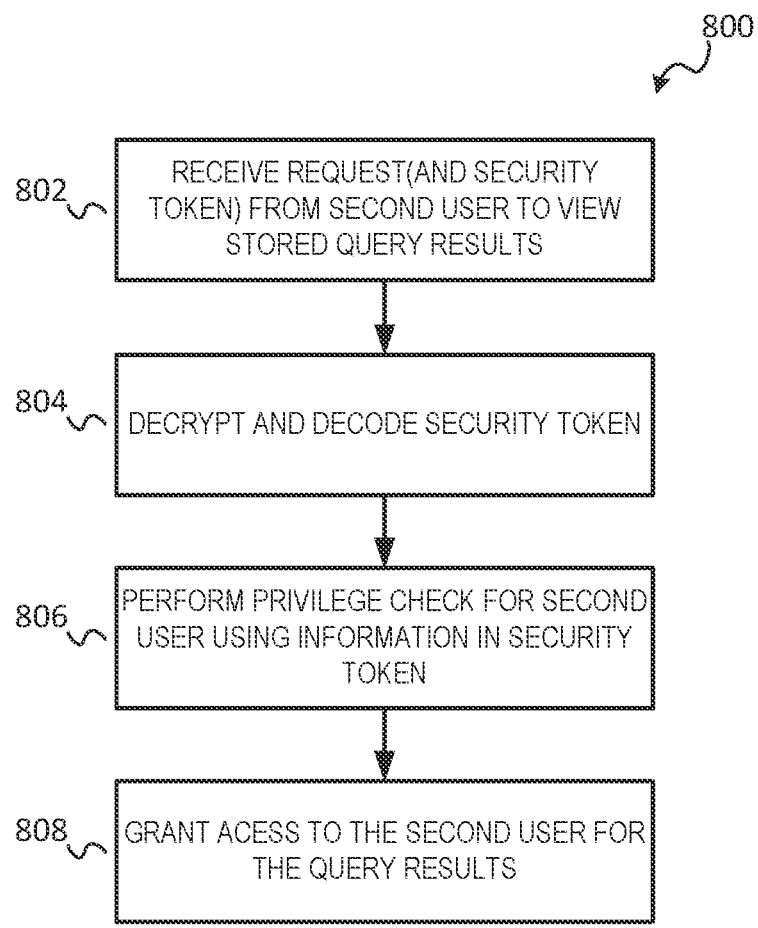
FIG. 8 a flow diagram for a method for receiving access to shared query results via a security token, according to some example embodiments.

FIG. 8 illustrates a flow diagram for a method 800 for receiving access to shared query results via a security token, according to some example embodiments. At operation 802, the system may receive a request from a second user to view stored query results, for example of the query described above with referenced to FIG. 6. The request may include the security token associated with the query results. At operation 804, the system may decrypt the security token. The decryption may be performed based on the account level information of the second user. Thus, the decryption process ensures that the security token is a valid token and that the second user has permission to access the security token because both the first user (who ran the original query) and the second user are authenticated in the same account. An organization, for example, may have multiple accounts, so the encryption and decryption may further protect the information in the query results within an organization. The information stored in the security token may be decoded, such as the stored information regarding the collected object IDs of the top-level objects referenced in the query.

At operation 806, the system may perform a privilege check for the second user to access the stored query results using the information stored in the security token without re-running the query. The privilege check may be performed on the collected object IDs of the top-level objects referenced in the query (e.g., objects in the parse tree). The privilege check may include comparing the role of the second user with the access privileges of the top-level objects referenced in the query. For example, the system may check that the second user's role has access privileges to all of the top-level objects references in the query. For example, the privilege check may go through each identified object and check that the second user has access to each object. Moreover, if a referenced object is dropped from the time the original query was executed and the time the second user is seeking address, the privilege check may fail.

At operation 808, the system may grant access to the query results to the second user based on the privilege check. If the privilege check for the second user privilege check is successful, the system may output the query results to the second user. If, however, the privilege check for the second user fails, the system may deny access to the query results to the second user. The second user may be allowed to download the results and the second user may be allowed to perform further processing of the results, such as a result scan.

The sharing feature of query results described herein may be disabled. For example, the first user who ran the original query and/or an administrator may disable the sharing of the query results. For example, additional metadata may be attached and stored with the result metadata to disable the security token (which may not be capable of being deleted). In one example, the additional metadata may include a timestamp disabling older security tokens.

Figure 9:
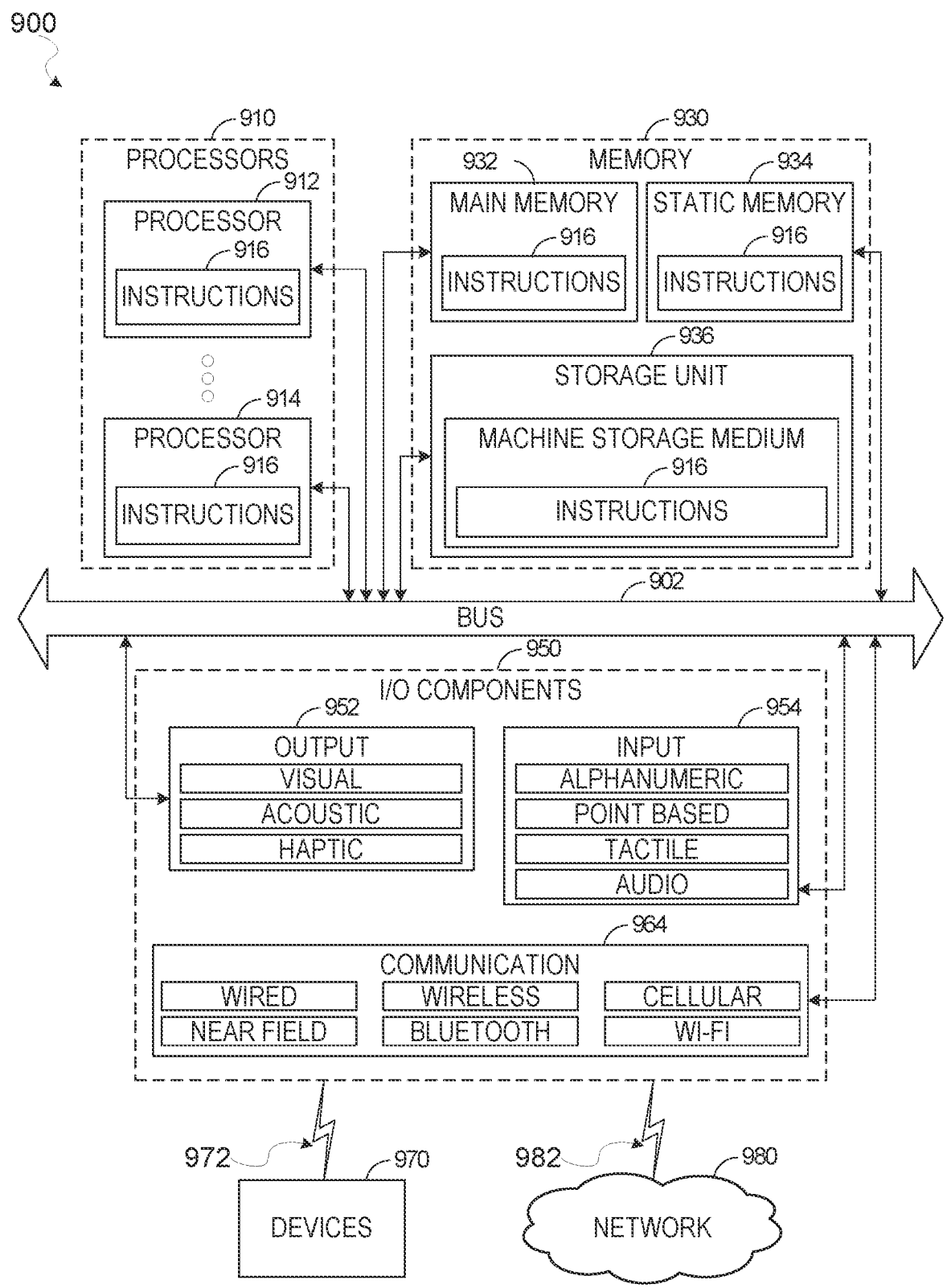
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of any one or more of the methods described herein. As another example, the instructions 916 may cause the machine 900 to implement portions of the data flows described herein. In this way, the instructions 916 transform a general, non-programmed machine into a particular machine 900 (e.g., the remote computing device 106, the access management system 118, the compute service manager 112, the execution platform 114, the access management system 118, the Web proxy 120, remote computing device 106) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the remote computing device 106, the access management system 118, the compute service manager 112, the execution platform 114, the Web proxy 120, and the devices 970 may include any other of these systems and devices.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1

A method comprising: receiving a query from a first user; performing privilege check of the first user to confirm that first user has access permission to perform the query; collecting object IDs of objects referenced in the query; executing the query to generate query results; storing information regarding the collected object IDs referenced in the query; outputting the query results to the first user and storing the query results for sharing with other users; receiving a request to access the stored query results from a second user; retrieving the stored information regarding the collected object IDs; performing privilege check of the second user to confirm that second user has access permission to access the query results using the stored information regarding the collected object IDs; and granting access to the second user for the query results.

Example 2

The method of example 2, further comprising: generating a security token including the collected object IDs; encrypting the security token; and sharing the security token with the second user.

Example 3

The method of any of examples 1-2, wherein the security token includes a user ID of the first user.

Example 4

The method of any of examples 1-3, wherein the security token includes job ID associated with the query.

Example 5

The method of any of examples 1-4, wherein the security token is encrypted using account level information of the first user.

Example 6

The method of any of examples 1-5, further comprising: decrypting the security token using account level information of the second user.

Example 7

The method of any of examples 1-6, further comprising: detecting whether the query is a sharable query type.

Example 8

The method of any of examples 1-7, wherein the shareable query type includes queries run in the context of a worksheet or dashboard.

Example 9

The method of any of examples 1-8, wherein the objects are top-level objects referenced in the query.

Example 10

A system comprising: one or more processors of a machine; and a memory storing instructions that, when executed by the one or more processors, cause the machine to perform operations implementing any one of example methods 1 to 9.

Example 11

A machine-readable storage device embodying instructions that, when executed by a machine, cause the machine to perform operations implementing any one of example methods 1 to 9.

What is claimed is:

1. A method comprising:
   collecting object identifiers of objects referenced in a query from a first user;
   storing query results generated by execution of the query for sharing with other users;
   storing information regarding the collected object identifiers referenced in the query;
   generating a security token including the collected object identifiers and job identifier associated with the query;
   encrypting the security token;
   receiving a request to access the stored query results from a second user, the request including the security token;
   decrypting the security token;
   performing privilege check of the second user to confirm that second user has access permission to access the query results; and
   granting access to the second user for the query results.

2. The method of claim 1, wherein encrypting the securing token includes using account level information of the first user for the encrypting.

3. The method of claim 2, wherein decrypting the security token includes using account level information of the second user for the decrypting.

4. The method of claim 1, wherein performing privilege check of the second user to confirm that second user has access permission to access the query results is based on the stored information regarding the collected object identifiers.

5. The method of claim 1, further comprising:
   detecting whether the query is a sharable query type.

6. The method of claim 5, wherein the shareable query type includes queries run in the context of a worksheet or dashboard.

7. The method of claim 1, wherein the objects are top-level objects referenced in the query.

8. A non-transitory machine-storage medium embodying instructions that, when executed by a machine, cause the machine to perform operations comprising:
   collecting object identifiers of objects referenced in a query from a first user;
   storing query results generated by execution of the query for sharing with other users;
   storing information regarding the collected object identifiers referenced in the query;
   generating a security token including the collected object identifiers and job identifier associated with the query;
   encrypting the security token;
   receiving a request to access the stored query results from a second user, the request including the security token;
   decrypting the security token;
   performing privilege check of the second user to confirm that second user has access permission to access the query results; and
   granting access to the second user for the query results.

9. The non-transitory machine-storage medium of claim 8, wherein encrypting the securing token includes using account level information of the first user for the encrypting.

10. The non-transitory machine-storage medium of claim 9, wherein decrypting the security token includes using account level information of the second user for the decrypting.

11. The non-transitory machine-storage medium of claim 8, wherein performing privilege check of the second user to confirm that second user has access permission to access the query results is based on the stored information regarding the collected object identifiers.

12. The non-transitory machine-storage medium of claim 8, further comprising:
    detecting whether the query is a sharable query type.

13. The non-transitory machine-storage medium of claim 12, wherein the shareable query type includes queries run in the context of a worksheet or dashboard.

14. The non-transitory machine-storage medium of claim 8, wherein the objects are top-level objects referenced in the query.

15. A system comprising:
    at least one hardware processor; and
    at least one memory storing instructions that, when executed by the at least one hardware processor, cause the at least one hardware processor to perform operations comprising:
    collecting object identifiers of objects referenced in a query from a first user;
    storing query results generated by execution of the query for sharing with other users;
    storing information regarding the collected object identifiers referenced in the query;
    generating a security token including the collected object identifiers and job identifier associated with the query;
    encrypting the security token;
    receiving a request to access the stored query results from a second user, the request including the security token;
    decrypting the security token;
    performing privilege check of the second user to confirm that second user has access permission to access the query results; and
    granting access to the second user for the query results.

16. The system of claim 15, wherein encrypting the securing token includes using account level information of the first user for the encrypting.

17. The system of claim 16, wherein decrypting the security token includes using account level information of the second user for the decrypting.

18. The system of claim 15, wherein performing privilege check of the second user to confirm that second user has access permission to access the query results is based on the stored information regarding the collected object identifiers.

19. The system of claim 15, the operations further comprising:
   detecting whether the query is a sharable query type.

20. The system of claim 19, wherein the shareable query type includes queries run in the context of a worksheet or dashboard.

21. The system of claim 15, wherein the objects are top-level objects referenced in the query.

* * * * *